United States Patent
Duffe (10) Patent No.: US 10,086,784 B2
(45) Date of Patent: Oct. 2, 2018

(54) BUMPER UNIT FOR A MOTOR VEHICLE (71) Applicant: FORD GLOBAL TECHNOLOGIES, LLC, Dearborn, MI (US)

(72) Inventor: Tobias Duffe, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/399,388

(22) Filed: Jan. 5, 2017

(65) Prior Publication Data

US 2017/0210316 A1 Jul. 27, 2017

(30) Foreign Application Priority Data

Jan. 25, 2016 (DE) .................. 10 2016 201 008

(51) Int. Cl.
| | |
|---|---|
| *B60R 19/02* | (2006.01) |
| *B60R 19/34* | (2006.01) |
| *B60R 19/04* | (2006.01) |
| *B60R 19/16* | (2006.01) |
| *B60R 19/26* | (2006.01) |

(52) U.S. Cl.
CPC ............ *B60R 19/023* (2013.01); *B60R 19/04* (2013.01); *B60R 19/16* (2013.01); *B60R 19/34* (2013.01); *B60R 2019/262* (2013.01)

(58) Field of Classification Search
CPC ....... B60R 19/023; B60R 19/16; B60R 19/04; B60R 19/34; B60R 2019/262
USPC .......... 296/187.1, 187.09; 293/133, 154, 155
See application file for complete search history.

(56) References Cited

U.S. PATENT DOCUMENTS

| | | | |
|---|---|---|---|
| 7,854,454 B2* | 12/2010 | Yang .................... | B60R 19/023 293/155 |
| 8,544,589 B1* | 10/2013 | Rupp ................... | B62D 21/152 180/274 |
| 8,733,823 B2 | 5/2014 | Brockhoff et al. | |
| 8,991,903 B1* | 3/2015 | Alavandi ............... | B60R 19/04 293/133 |
| 9,010,845 B1* | 4/2015 | Ramoutar .............. | B60R 19/14 293/155 |
| 9,045,100 B2* | 6/2015 | Kaneko .................. | B60R 19/34 |
| 9,073,503 B2* | 7/2015 | Ookubo ............... | B62D 21/152 |
| 9,415,735 B1* | 8/2016 | Baccouche ............ | B60R 19/34 |
| 2006/0181090 A1* | 8/2006 | Boivin .................... | B60R 19/18 293/146 |
| 2008/0252087 A1 | 10/2008 | Roll et al. | |

(Continued)

*Primary Examiner* — Jason S Morrow
*Assistant Examiner* — E Turner Hicks
(74) *Attorney, Agent, or Firm* — Jason Rogers; Brooks Kushman P.C.

(57) ABSTRACT

The invention concerns a bumper unit for a motor vehicle, with a bumper cross-member which is connected to a vehicle structure via a crumple element. To provide a bumper unit which has optimal crash behavior on frontal impacts both with small overlap and with larger overlap, according to the invention it is provided that a deformation element is arranged on the bumper cross-member outside of the crumple element with a deformation portion running obliquely relative to a vehicle longitudinal axis X, towards and spaced from the vehicle structure. It is proposed that the deformation element has a rearward running connecting portion which is connected to the bumper cross-member and a center portion running towards the outside from the connecting portion and adjoining the deformation portion.

15 Claims, 7 Drawing Sheets

(56) References Cited

U.S. PATENT DOCUMENTS

| | | | |
|---|---|---|---|
| 2013/0069377 A1* | 3/2013 | Qu | B60R 19/34 293/133 |
| 2013/0234456 A1* | 9/2013 | Brockhoff | B60R 19/34 293/133 |
| 2014/0008924 A1* | 1/2014 | Han | B60R 19/18 293/133 |
| 2014/0062106 A1* | 3/2014 | Han | B60R 19/34 293/133 |
| 2014/0091585 A1* | 4/2014 | Ramoutar | B60R 19/24 293/133 |
| 2014/0091595 A1* | 4/2014 | Ramoutar | B60R 19/24 296/187.09 |
| 2014/0117717 A1* | 5/2014 | Parkila | B60R 19/24 296/187.09 |
| 2014/0167450 A1* | 6/2014 | Sotoyama | B62D 21/152 296/187.09 |
| 2014/0312637 A1 | 10/2014 | Ramoutar et al. | |
| 2014/0361559 A1 | 12/2014 | Sakakibara et al. | |
| 2015/0097394 A1 | 4/2015 | Alavandi et al. | |
| 2015/0137556 A1 | 5/2015 | Alavandi et al. | |
| 2015/0298634 A1* | 10/2015 | Hara | B60R 19/34 293/133 |
| 2015/0336525 A1* | 11/2015 | Nam | B60R 19/04 296/187.1 |

\* cited by examiner

BUMPER UNIT FOR A MOTOR VEHICLE

CROSS-REFERENCE TO RELATED APPLICATIONS

This application claims foreign priority benefits under 35 U.S.C. § 119(a)-(d) to DE 10 2016 201 008.5 filed Jan. 25, 2016, which is hereby incorporated by reference in its entirety.

TECHNICAL FIELD

The invention concerns a bumper unit for a motor vehicle.

BACKGROUND

Modern motor vehicles normally incorporate crumple zones, i.e. the regions or components of the vehicle which absorb energy by deformation in a collision, and thus protect other vehicle regions, such as in particular the occupants, from damage. Bumpers arranged at the front and rear in the direction of travel extend substantially transversely to the direction of travel. In a typical construction concept, the actual bumper or bumper cross-member is connected to a vehicle structure, e.g. the longitudinal members, by energy absorption elements (e.g. crash boxes, crash tubes or crumple boxes) which may also be called crumple elements. The bumper cross-member in itself, because of its design and/or the material used, may be designed more stably, while the energy absorption elements which extend approximately in the direction of travel are less stable. These may e.g. be made of aluminum or an aluminum alloy, and deform comparatively easily if a force is exerted thereon via the bumper. In particular, in frontal impacts at low speed, ideally the deformation can be substantially restricted to the energy absorption elements, while the vehicle structure remains undamaged to reduce the repair costs. The bumper may in some cases be configured integrally with the energy absorption elements. The actual connection to the vehicle chassis normally takes place via connecting plates which are welded to the energy absorption elements and can be connected to the vehicle structure e.g. a longitudinal member for example by bolting.

From safety aspects, SORB (small offset rigid barrier) collisions constitute a particular challenge. In these, the vehicle collides with an obstacle or another vehicle which is significantly offset to the vehicle center, wherein there is only a slight overlap. The actual impact may even take place outside the actual crumple element, so there is a danger that this absorbs only comparatively little energy, while the colliding obstacle can penetrate a long way, in some cases into the region of the front wheel. This may lead to further deformations which could extend as far as the vehicle interior. A fundamental problem in this context is that the part of the bumper cross-member which is arranged outside the crumple element—and hence in a SORB collision makes primary contact with the obstacle—deforms too easily to effectively absorb energy for example, or also to achieve a lateral deflection of the vehicle away from the obstacle. In the prior art, attempts have been made to eliminate this, firstly by the provision of deflection plates, impact plates or similar structures attached at the sides of the bumper cross-member, and secondly by a connection between the bumper cross-member (or side parts attached thereto) and a longitudinal member to which the bumper cross-member is connected by a crumple element. The latter measure aims to deflect the force action, wherein the cross-member is ideally deformed by a laterally acting force and thus absorbs energy. The problem with all these measures is that, firstly, the vehicle weight must not be increased excessively, and secondly the crash behavior in SORB collisions must not be improved to the detriment of the crash behavior in other situations. In other words, the additional or modified elements must not adversely affect the other crash behavior, in particular the function of the crumple elements.

US 2014/0312637 A1 and US 2014/0091585 A1 show an assembly of a vehicle with a longitudinal member and a bumper bar which has a bumper bar extension extending laterally outside the longitudinal member. Furthermore, the assembly comprises a connecting element which is connected by an inner connecting portion to the longitudinal member and by an outer connecting portion to the bumper. Said connections are formed as hinge connections, so that on a frontal impact, the connecting element can pivot relative to the bumper bar and the longitudinal member and serve to introduce a lateral force from the bumper bar into the longitudinal member, which leads to its deformation.

US 2014/0361559 A1 describes a front structure of a motor vehicle with a front element which is arranged on a longitudinal member and comprises an energy-absorbing portion, and a bumper bar to which the front element is attached. Furthermore, the structure comprises a first load transfer element which protrudes laterally outward from the front element on a rear side of the energy-absorbing portion, and a second load transfer element which protrudes from the front element on a front side of the energy-absorbing portion. On a collision with a small overlap region, it is provided that the energy-absorbing region is compressed, wherein the second load transfer element is moved against the first load transfer element, leading to a lateral deformation of the longitudinal member.

U.S. Pat. No. 9,010,845 B1 discloses a vehicle with a lateral support element, e.g. a longitudinal member, a bumper assembly connected thereto and extending in the transverse direction of the vehicle, and a movable connecting assembly extending between the support element and the bumper assembly. It consists of an inner and an outer connecting element which are pivotably connected together. A pivotable connection exists firstly with the bumper assembly and secondly with the support element. On a frontal impact, the two connecting elements—depending on the nature of the impact—may pivot relative to each other to varying extents. The two elements pivot so far that they lie against each other and a lateral force is transmitted to the support elements. The support elements deform on a small overlap impact with a rigid barrier.

US 2015/0137556 A1 discloses a deflection plate arrangement for a vehicle with a bumper and a longitudinal member. The arrangement comprises a deflection plate which extends from laterally outside the bumper up to an outer end and returns to a rear end in the vicinity of longitudinal member, a guide element is attached to the rear end and has a guide face extending in the longitudinal direction, and a carrier attached to the longitudinal member and received by the guide element. On a frontal impact, the carrier (which e.g. may be configured as a roller) and the guide face (which e.g. may be configured as a guide rail) cooperate to guide the rear end. The deflection plate arrangement allows a lateral deflection of the vehicle on an impact with small overlap, but at the same time does not detract from the function of a crumple box.

U.S. Pat. No. 8,733,823 B2 discloses a bumper system for a motor vehicle with a cross-member arranged transversely to the direction of travel and two longitudinal members arranged parallel to the direction of travel, wherein the cross-member is connected to the longitudinal members directly or by means of a coupling element. The cross-member has two connecting portions for connecting to the longitudinal member or to two coupling elements, a center portion between the connecting portions, and two end portions which terminate the cross-member towards the vehicle sides. The cross-member is designed to fold with one end portion in the event of a frontal impact with small overlap, wherein said portion rests on a deformation element arranged behind it.

DE 10 2007 017 857 A1 describes a bumper assembly for a motor vehicle with a bumper cross-member running transversely to the longitudinal members of the vehicle and comprising a center portion and end portions which protrude beyond the longitudinal members and are curved or chamfered towards the rear. Each end portion at its outer end has a retaining element oriented in the transverse direction of the vehicle to limit sliding the obstacle from the respective end portion on an impact with small overlap. The end portion of the retaining element has an S-shaped profile.

US 2015/0097394 A1 discloses a front assembly of a motor vehicle with a chassis longitudinal member, a bumper bar arranged in front of this, an impact plate and a gripper bracket. The impact plate comprises a front leg which extends outside of and is attached to the bumper bar, and a rear leg extends from an outer end of the front leg to the chassis longitudinal member. The gripper bracket is attached to the chassis longitudinal member behind the rear leg. On a frontal impact, the rear leg slides to the rear along the longitudinal member until it hits the gripper bracket, which stops its movement.

In the context of the prior art outlined above, the provision of a bumper unit with optimized crash behavior in relation to frontal impacts with small overlap without adversely affecting crash behavior for impacts with greater overlap, leaves room for improvement.

SUMMARY

The invention is based on the object of providing a bumper unit which has optimal crash behavior on frontal impacts with both small overlap and with larger overlap.

It is pointed out that the features and measures listed individually in the description which follows may be combined with each other in any technically sensible manner and disclose further embodiments of the invention. The description characterizes and specifies the invention further, in particular in connection with the figures.

The invention provides a bumper unit for a motor vehicle. The motor vehicle here may be in particular a car or truck. The bumper unit has a bumper cross-member which is connected to a vehicle structure via a crumple element. The crumple element, which may also be called an energy absorption element, may for example be formed as a crash box, a crash tube or a crumple box. Its function is to deform relatively easily in comparison with adjacent components on an accident, in particular a frontal collision, and thus protect adjacent components at least against plastic deformation in an ideal fashion. The bumper cross-member, which may also be called simply a bumper or bumper bar, is connected to a vehicle structure via the crumple element. In other words, the bumper cross-member is connected to the crumple element and this is in turn connected to the vehicle structure, which expressly includes the possibility that the crumple element is formed integrally with the bumper cross-member. Normally, the bumper cross-member is connected to two crumple elements arranged symmetrically relative to the vehicle center. The term "vehicle structure" here comprises in particular load-bearing parts of the vehicle, e.g. the chassis or e.g. a longitudinal member. Typically, the crumple element is connected to a longitudinal member. In any case, the connection of the crumple element to the vehicle structure may be indirect, i.e. via an interposed component e.g. a connecting plate, which may be welded to the crumple element. In the known fashion, the bumper in the fitted state extends transversely to the direction of travel, i.e. along the Y-axis (transverse axis) of the vehicle, although often it does not run completely parallel to the Y-axis but e.g. may be curved. The bumper unit is normally provided for mounting on the front of the vehicle. In this context, the further description is given in accordance with a configuration in which the bumper cross-member (in the direction of the X-axis) lies in front of the crumple element which in turn is arranged in front of the vehicle structure.

A mandrel element is arranged on the bumper cross-member outside of the crumple element, with a mandrel portion running obliquely relative to the vehicle longitudinal axis, towards and spaced from the vehicle structure, for deformation of the vehicle structure. Here and below, the terms on the "on the outside" or "outer" mean that the element concerned, along the Y-axis (transverse axis) of the vehicle, is located on the side facing away from the vehicle center. Correspondingly, the terms "on the inside" or "inner" mean that the corresponding element, along the Y-axis, is located on the side facing the vehicle center. The mandrel element is thus arranged in the region of the bumper cross-member which protrudes laterally beyond the crumple element. This region may in some cases be formed very short. The mandrel element comprises the mandrel portion which is designed for or should provoke the deformation of the vehicle structure. This function, which will be explained in more detail below, describes how, at least with a suitable contact point and angle, the mandrel portion is able to deform the vehicle structure by the action of force thereon. Evidently, this may also comprise the deformation of the mandrel portion itself and/or other parts of the mandrel element. The terms "mandrel element" and "mandrel portion" should not be interpreted restrictively with regard to design, but designate merely the property of being able to deform and act on the vehicle structure, which can be compared with the function of a mandrel. Alternatively, for example, the terms "pressing element" and "pressing portion", or "deformation element" and "deformation portion" could be used, since the element and the portion are designed to introduce a force into the vehicle structure and hence deform this. The mandrel portion runs towards the vehicle structure obliquely relative to the vehicle longitudinal axis (X-axis). This means that the mandrel portion, viewed from front to rear, runs obliquely inward. The mandrel portion need not be straight but may e.g. also be curved or angled.

The vehicle structure, i.e. the longitudinal member, could also be called a capture structure. Said capture structure, i.e. the longitudinal member, to a certain extent serves to capture the mandrel portion, i.e. limit its movement or stop this completely. It could thus be said that the structure forms a type of abutment for the mandrel portion.

However, in non-deformed state, the longitudinal member is arranged on the inside relative to the mandrel portion, i.e. is arranged further inward than the mandrel portion, so that on a pure rearward movement of the mandrel portion, no impact with the capture structure takes place. Here it is rather necessary for the mandrel portion to move inward under deformation (i.e. in the direction of the Y-axis towards the vehicle center). Said movement may evidently be combined with a movement along the X-axis (in particular towards the rear). In general, the longitudinal member is not only arranged further inward relative to the mandrel portion (in the direction of the Y-axis) but also behind this (in the direction of the X-axis). Preferably, along the Z-axis (height axis), the longitudinal member lies at the same height as the mandrel portion. Alternatively, the mandrel may be stepped in the Z-axis direction with the bumper beam being lower than the side rail but being stepped up to the side rail to create a sufficient overlap in the direction of the Z-axis with the side rail.

The phrase "deformation-induced" means that deformation takes place of at least part of the bumper unit, e.g. the bumper cross-member, crumple element and/or mandrel element. As a result of this deformation therefore, the mandrel portion can move inward so that in the Y-direction it reaches the region of the longitudinal member. As part of this movement, the mandrel portion may already come into contact with the longitudinal member or may initially still be spaced from the longitudinal member along the X-axis. In any case, the structure, i.e. the longitudinal member, ensures that on impact of the mandrel portion, its rearward movement is limited. To a certain extent an intermeshing, engagement or fixing of the mandrel portion takes place on the vehicle structure, i.e. on the longitudinal member. This prevents the mandrel portion from sliding to a greater or lesser degree on the vehicle structure, without causing a substantial deformation thereof In a typical SORB scenario, an obstacle at least largely misses the region of the crumple element and instead impacts the external region of the bumper cross-member and/or the mandrel element arranged there. A deformation takes place which leads to the mandrel portion moving inward and being retained by the longitudinal member. Because of the oblique position of the mandrel portion, an inwardly directed force component results which acts from the obstacle via the mandrel portion on the vehicle structure, i.e. on the longitudinal member, and deforms this. The deformation energy absorbed here means that, even in cases in which there is no significant deformation of the crumple element, other parts of the vehicle are better protected.

Since, in non-deformed state, the mandrel portion however lies on the outside relative to the longitudinal member, it does not come into interaction therewith if it merely moves rearward (or rearward and outward). Therefore, on a frontal impact with large overlap in which the crumple element or elements absorb a majority of the deformation energy, the mandrel portion normally moves past the longitudinal member so that, to a certain extent, it does not come into effect and does not detract from the normal deformation of the crumple element. Thus the bumper unit according to the invention achieves a significant improvement in the crash behavior in SORB accidents without adversely affecting the crash behavior in accidents with larger overlap in comparison with a unit without the mandrel element.

In principle, embodiments of the invention are conceivable in which the mandrel element has a certain, albeit limited, mobility relative to the bumper cross-member. Preferably however, the mandrel element is rigidly connected to the bumper cross-member. This means that during normal operation of the vehicle, i.e. without collision, there is no relative movement between the mandrel element and the bumper cross-member. Such a rigid connection may be created by form fit, force fit and/or material fit. In some cases, the mandrel element may even be configured integrally with the bumper cross-member. Preferred embodiments of the connection are discussed further below.

As already outlined above, the crumple element may be connected to the vehicle structure via a connecting plate, e.g. by welding. The connecting plate may be connected to a flange of the vehicle structure, e.g. a longitudinal member, e.g. by bolting. In a preferred embodiment, the mandrel portion is arranged on the outside relative to the connecting plate. Normally, the mandrel portion is here spaced from the connecting plate but not connected thereto. In any case, the entire mandrel portion (along the Y-axis) here lies further out than the connecting plate. In this way, it is excluded in advance that the mandrel portion, on a deformation-induced movement in the direction of the X-axis (i.e. towards the rear), collides with the connecting plate. This can e.g. ensure that on a frontal collision with large overlap, in which the function of the crumple element in itself is sufficient, the mandrel portion does not cooperate undesirably with the connecting plate and thus adversely affect the crash behavior.

According to the invention, the mandrel element has a rearward running connecting portion which is connected to the bumper cross-member, and a center portion running outward from the connecting portion and adjoining the mandrel portion. The connecting portion may here run substantially parallel to the X-axis and in particular substantially parallel to the crumple element. The center portion may run parallel to the Y-axis or at an angle thereto. It is a function of the connecting portion to shift the mandrel portion sufficiently far to the outside that it is arranged further out than the connecting plate, and thus runs past the latter on the outside. Said three portions may at least partially be formed integrally or from the same sheet metal part. The mandrel element may be composed of said elements of connecting portion, center portion and mandrel portion, or be configured integrally.

According to an advantageous embodiment, a first guide face is formed on an inside of the mandrel element and arranged in front of the connecting plate, running obliquely outward from front to rear. In other words, a front part of the guide face lies further inward than a rear part, or an inner part lies further forward than an outer part. The guide face here need not be formed flat but may e.g. have a curvature. It is arranged in front of the connecting plate, wherein in particular at least parts of the guide face lie in front of the connecting plate in the direction of the X-axis. On a frontal impact with large overlap in which the crumple element is compressed, the bumper cross-member with the mandrel element moves towards the connecting plate until finally the guide face hits the connecting plate. Because of the tilt i.e. curvature of the guide face, a resulting force occurs in the transverse direction (along the Y-axis) which may lead to a deformation of the connecting plate, but in any case bends i.e. guides the mandrel element or at least parts thereof towards the outside. With suitable design, in a case in which the function of the crumple element is sufficient, the mandrel element simply deflects laterally so that the mandrel portion remains free from contact with the longitudinal member. In other words, there is no significant reduction in the function of the crumple element. The energy absorption associated with the lateral deflection movement or bending of the mandrel element may in some cases positively affect the crash behavior. Said first guide face may in particular be formed on the center portion.

According to an advantageous embodiment, the mandrel element has a contact face arranged in front of the mandrel portion and extending from inside to outside. Said contact face is arranged in front of the mandrel portion in the X-direction, which includes the possibility that it is configured on its front side. The contact face extends from inside to outside, i.e. viewed from the front has at least a certain extension. It may here at least in portions be formed flat, but this is not however absolutely necessary. At least in portions, the contact face may extend parallel to the Y-Z plane or enclose therewith an angle of less than 30°. The function of the contact face is to allow a better engagement with a colliding obstacle, so that at this point a considerable force action is produced by the obstacle. Since the contact face is located in front of the mandrel portion, the effect on the mandrel portion may be compared to a hammer blow on the head of a chisel. However, in contrast to this, normally the aim is not a pure movement of the mandrel portion in the direction of the force action (i.e. normally approximately in the direction of the X-axis), but a type of swivel movement and/or a lateral deflection of the mandrel portion, whereby this (or at least one end thereof) moves in the direction of the vehicle structure, i.e. in the direction towards the longitudinal member.

According to a refinement, this may be promoted in that the contact face is tilted towards the outside. In other words, the contact face does not run parallel to the Y-Z plane but an inner part of the contact face lies further forward than an outer part. The incline relative to said plane may be relatively slight, e.g. less than 30° or less than 15°. In any case, this may ensure that on a completely frontal impact (i.e. parallel to the X-axis), a resulting force is produced between the obstacle and the contact face which runs in the direction of the Y-axis and hence provokes an outwardly directed force on the obstacle and an inwardly directed force on the mandrel portion.

On the inside, a second guide face may adjoin the contact face. This may be formed e.g. on the outside on the connecting portion. It may be slightly tilted inward relative to the X-Z plane, i.e. a front part of the second guide face lies further in than a rear part. Such a guide face also transmits a force directed along the Y-axis between the mandrel element and the obstacle, although this is relatively slight. It may however serve to guide the obstacle towards the contact face, or conversely to deform the mandrel element slightly so that the obstacle hits the contact face.

To connect the mandrel element to the bumper cross-member, various means are conceivable. The mandrel element may thus be connected to the bumper cross-member by material fit, e.g. by welding, or even be configured integrally therewith. Preferably however, the mandrel element is connected to the bumper cross-member by form-fit connecting means. Such connecting means may in particular be bolts and/or rivets. Here the bumper cross-member need only be modified slightly in comparison with a bumper unit without mandrel element, wherein holes, possibly threaded, for said connecting means may be provided. On assembly, the mandrel element may be welded or bolted or riveted on as the last part of the assembly.

According to one embodiment, the mandrel element comprises at least one sheet metal part. It may in particular consist of one or more sheet metal parts. The several sheet metal parts may be welded together, wherein e.g. they may as a whole form a hollow profile. The material for the sheet metal is in particular steel, although other metals are not excluded. Said embodiment allows a relatively light construction of the mandrel element, wherein it has however been found that, despite this, sufficient stability is present to cause deformation of the vehicle structure, e.g. a longitudinal member, by the action of force thereon. This may be achieved for example in that, on impact on the vehicle structure, the sheet metal of the mandrel element is oriented such that the force acts substantially in the plane of the metal, whereas the force acts at a relatively large angle e.g. even perpendicularly to the plane of a panel of the vehicle structure. Thus under certain circumstances, a deformation of the vehicle structure itself may occur if the mandrel element is made of a thinner metal than the vehicle structure itself. The mandrel element may however also be cast for example from steel or another metal, e.g. aluminum. Also e.g. it is conceivable that the mandrel element is made at least partially as an aluminum extruded profile.

According to a further embodiment, the mandrel element tapers at the end. In particular, this may mean that the mandrel portion tapers at the end. The corresponding end, which lies opposite the part connected to the bumper cross-member, may e.g. taper in the X-Y plane i.e. be configured as a wedge. In any case, the taper i.e. the reduction in cross-section means that the end, when it comes into contact with the vehicle structure, there builds up a greater pressure on an initially small contact area, which is comparable to the effect of a mandrel or chisel. This may promote the deformation of the vehicle structure.

Further advantageous details and effects of the invention are explained in more detail below with reference to exemplary embodiments shown in the figures. These show:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, the same parts always carry the same reference numeral so these are usually only described once.

Figure 1:
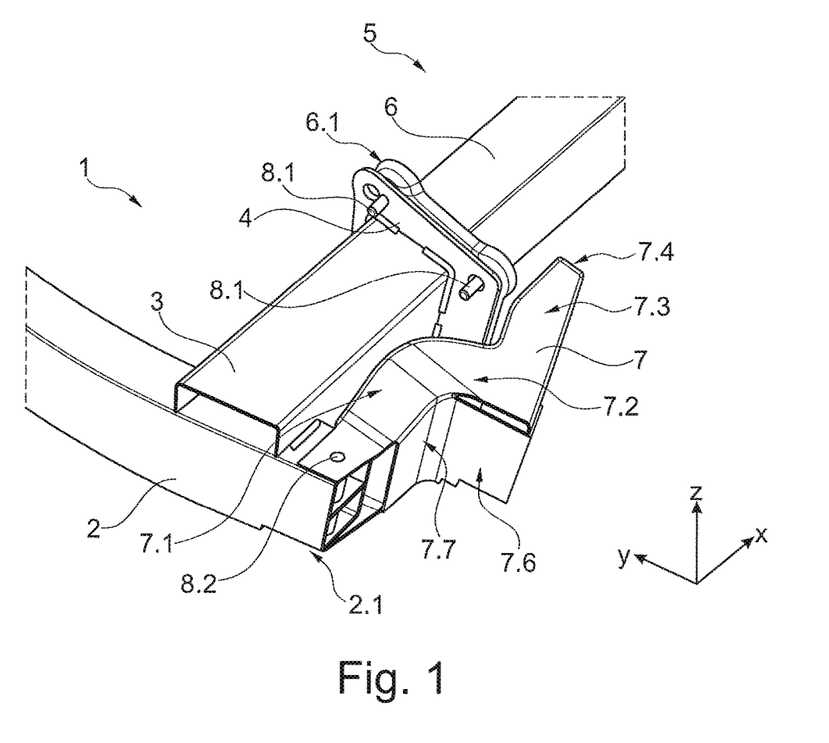
FIG. 1 is a perspective depiction of a bumper unit according to the invention.
Figure 2:
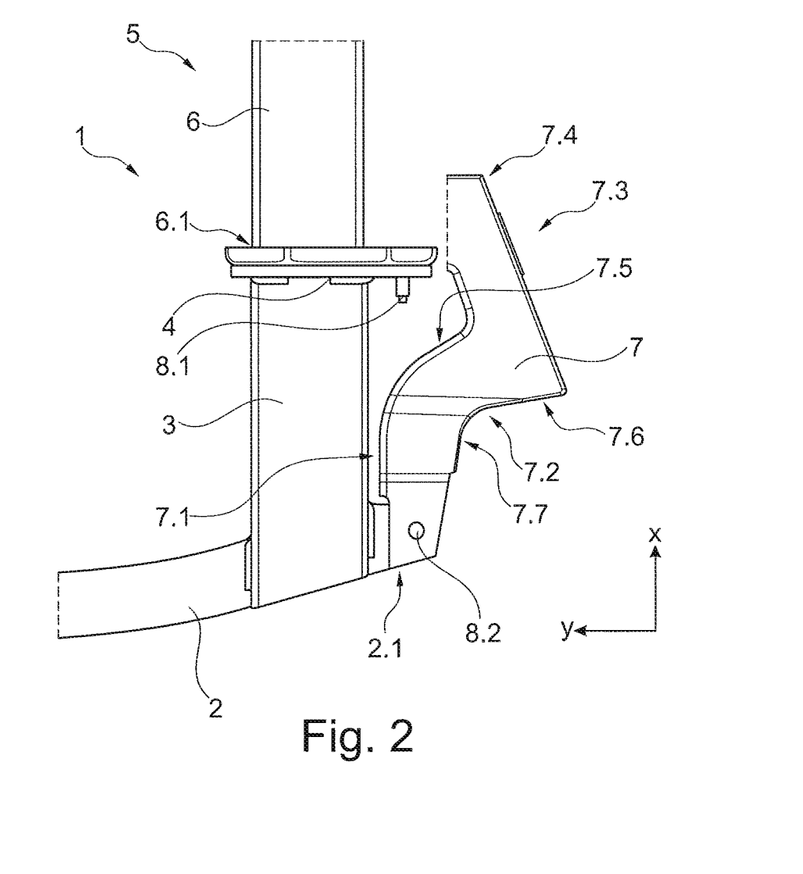
FIG. 2 is a top view of the bumper unit from FIG. 1.

FIG. 1 and FIG. 2 show a first embodiment of a bumper unit 1 according to the invention for a motor vehicle, wherein FIG. 1 shows a perspective view and FIG. 2 a top view, in which the drawing plane corresponds to the X-Y plane. The bumper unit 1 as a whole is constructed symmetrically to the center axis of the vehicle, wherein the figures each show only one part. A bumper cross-member 2 running approximately in the direction of the Y-axis (transverse axis) is connected by a weld connection to a crumple box 3 which extends approximately as a rectangular hollow profile approximately in the direction of the X-axis (longitudinal axis). The crumple box 3 is in turn welded to a connecting plate 4 which extends approximately in the Y-Z plane. By means of several bolts 8.1, the connecting plate 4 is connected to a flange 6.1 of a longitudinal member 6 which forms part of a vehicle structure 5. This is a bumper unit 1 which for example is placed on the vehicle front, so that in this sense the bumper cross-member 2 is arranged at the front and the crumple box 3 and longitudinal member 6 behind it.

A mandrel element 7 is arranged on a side region 2.1 of the bumper cross-member 2 located outside of the crumple box 3, and may consist of several sheet metal parts of steel connected together, preferably welded together, or may be formed integrally. It has a connecting portion 7.1 which extends rearward approximately in the X-direction and is secured to the side region 2.1 of the bumper cross-member 2 by means of bolts 8.2, so that a rigid connection results. A center portion 7.2 adjoins the connecting portion 7.1 and extends outward approximately in the Y-axis. Adjoining this is a mandrel portion 7.3 which runs obliquely inward relative to X-axis. As shown in FIG. 2 in particular, the connecting portion 7.1 and parts of the center portion 7.2 lie front of the connecting plate 4 in the X-direction, or at the level thereof in the Y-direction. In contrast, the mandrel portion 7.3 is arranged laterally outside the connecting plate 4. The mandrel portion 7.3 tapers in an end region 7.4, wherein it runs to a point. On an inside of the center portion 7.2, a first guide face 7.5 is formed which is curved and as a whole runs obliquely relative to the X-axis. On the front side of the mandrel portion 7.3, a contact face 7.6 is formed which is slightly tilted to the outside relative to the Y-Z plane. This transforms into a second guide face 7.7 which is arranged on the connecting portion 7.1 and, viewed from front to rear, runs obliquely outward.

Figure 3:
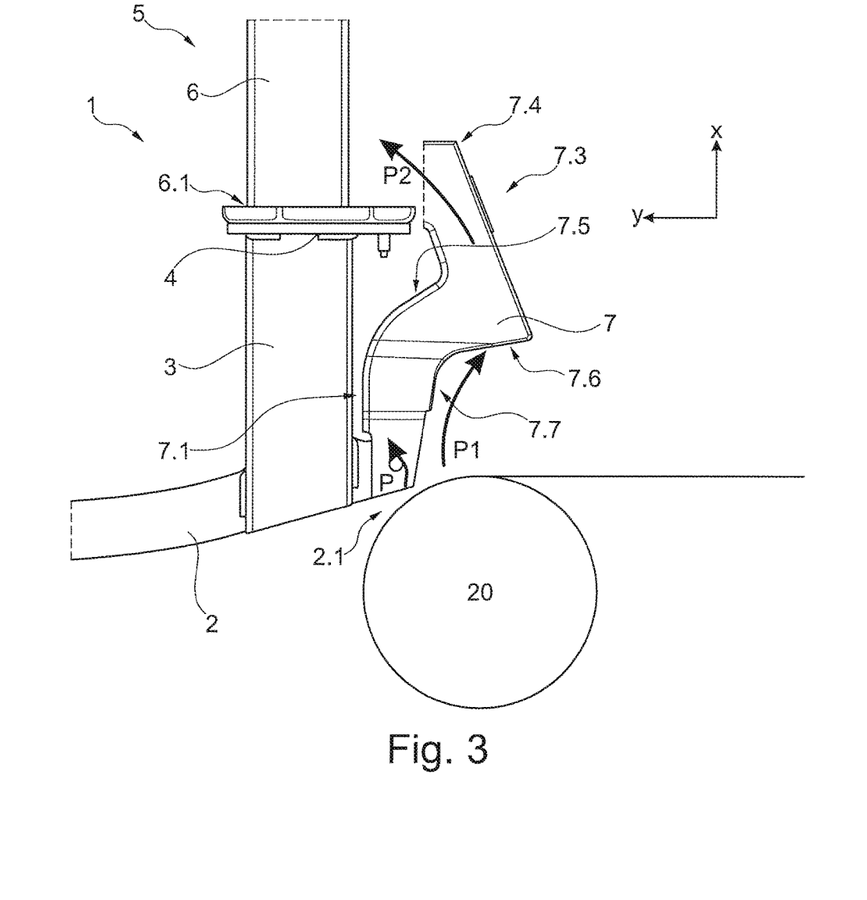
FIG. 3 is a top view of the bumper unit from FIG. 1 and an obstacle in a first accident situation.

FIG. 3 shows in a top view, which corresponds to FIG. 2, the bumper unit 1 and an obstacle 20 impacting this with small overlap. This is a SORB collision in which primarily the side region 2.1 of the bumper cross-member 2 is hit, which can lead to the crumple box 3 not undergoing any substantial deformation and thus absorbing almost no energy. In the bumper unit 1 shown however, as well as a side region 2.1, the mandrel element 7 is also hit, wherein in a first phase of the collision, the side region 2.1 and the connecting portion 7.1 adjoining this deform and are pressed inward to a certain degree, as indicated by the bold black arrow P. At the same time however, the obstacle 20—at least in relation to the bumper unit 1—is deflected slightly outward partly due to the shaping of the second guide face 7.7. The movement of the contact face 7.6 is indicated by the bold arrow P1. In the further progress, the obstacle 20 hits the contact face 7.6 and thus exerts a substantial force on the mandrel portion 7.3. Partly because the contact face 7.6 is tilted slightly outward, the mandrel portion 7.3, by a combination of displacement and rotation, is moved inward towards the longitudinal member 6 (indicated by the bold black arrow P2) until it comes into engagement therewith. In general, a force continues to be exerted by the obstacle via the contact face 7.6 on the mandrel portion 7.3, driving this further back, so that finally, with its preferably tapered end portion 7.4, it hits the longitudinal member 6. The latter is sufficiently stable to at least restrict a further rearward movement of the mandrel portion 7.3. Thus effectively there is an intermeshing of the mandrel portion 7.3 with the longitudinal member 6. Via the contact face 7.6, there is also a lateral force component which drives the mandrel portion into the side of the longitudinal member 6, deforming this. Thus even if the crumple box 3 only absorbs energy to a slight extent, there is an effective energy absorption by the longitudinal member 6. Also, the obstacle 20 and the bumper unit 1 (and hence the vehicle) move laterally apart. The sequence is shown diagrammatically in FIGS. 5A to 5C.

Figure 4:
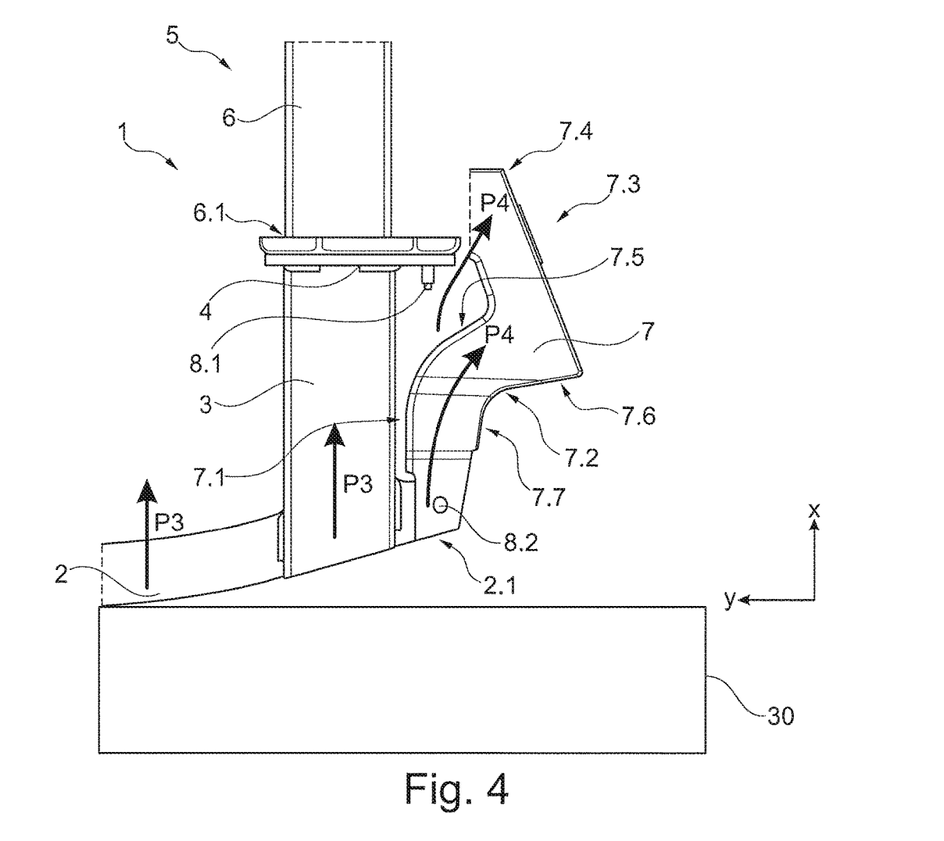
FIG. 4 is a top view of the bumper unit from FIG. 1 and the obstacle in a second accident situation.

FIG. 4 illustrates a different accident situation in which an obstacle 30 is hit frontally with large overlap. In such a situation, normally the crumple boxes 3 provide adequate protection insofar as they deform reliably and can hence absorb energy. In order not to detract from the function of the crumple box 3, it is evidently desirable for the mandrel element 7 to influence the deformation process as little as possible. As indicated by the bold black arrows P3, the deformation and movement of the bumper cross-member 2 and the crumple box 3 connected thereto take place substantially in the direction of the X-axis. This leads to the center portion 7.2 moving with the first guide face 7.5 towards the connecting plate 4 and finally hitting this. If it wedges there or otherwise became seized, this could adversely affect the functions of the crumple box 3. Due to the angled first guide face 7.5 however, a lateral sliding of the connecting plate 4 takes place which may be accompanied by a bending of the connecting portion 7.1, or even of the connecting plate 4. In any case, the central portion 7.2 and the mandrel portion 7.3 deflect laterally, as indicated by the bold black arrow P4.

FIGS. 5A-5C illustrate again the sequence of a collision with an obstacle 20 with slight overlap.

Figure 5A:
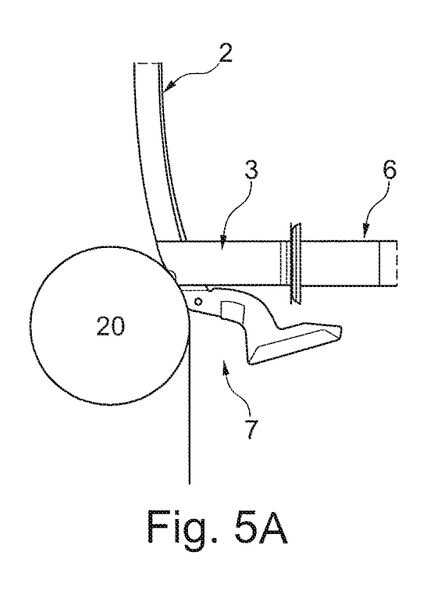
FIG. 5A-5C is a temporal development of an impact between a bumper unit according to the invention and an obstacle.
Figure 5B:
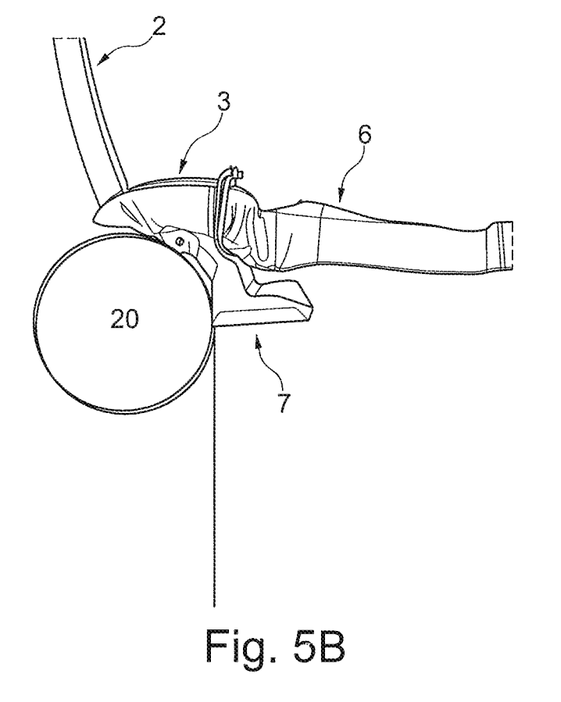
Figure 5C:
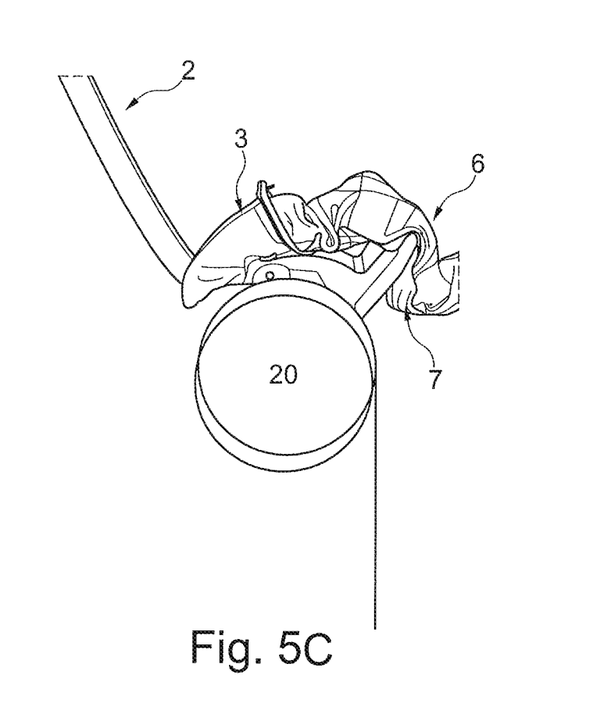

In FIG. 5A, the impact with the obstacle 20 takes place in a region which partially still contains the crumple box 3, but above all the outer region of the bumper cross-member 2. Due to the initially still slight deformation of the crumple box 3 and bumper cross-member 2, the mandrel element 7 in this case already moves slightly rearward and inward. This process is continued in FIG. 5B, wherein the mandrel element 7 has not yet engaged in the longitudinal member 6. The crumple box 3 deforms, i.e. bends further, while the obstacle 20 moves along the bumper cross-member 2 and hence exerts a force on the mandrel element 7 via the bumper cross-member 2, which force in turn acts on the longitudinal member 6 and begins to deform this, as shown in FIG. 5C. FIG. 5C shows the deformation of the longitudinal member 6, wherein the deformation of the mandrel element 7 as a whole remains slight since its longitudinal extension coincides substantially with the direction of the force action. FIG. 5C also shows how the obstacle 20 is deflected laterally relative to the bumper unit 11 (and hence the vehicle), so that penetration into the region of a vehicle wheel is unlikely or remains limited.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bumper assembly comprising:
   a bumper;
   a crumple element connected by a connecting plate to a vehicle frame; and
   a deformation element spaced from and extending longitudinally relative to the vehicle frame, the deformation element including a rearward running connection portion connected to the bumper outside the crumple element, a deformation portion disposed outside the connecting plate and running obliquely relative to a longitudinal axis, a center portion running outward from the connection portion and adjoining the deformation portion, wherein a first guide face is provided on an inside of the deformation element and extends obliquely rearward to the rear, wherein the first guide face is disposed in front of the connecting plate.

2. The bumper assembly of claim 1 wherein the deformation element is rigidly connected to the bumper.

3. The bumper assembly of claim 1 wherein the crumple element is connected to the vehicle frame by a connecting plate, wherein the deformation portion is disposed outside the connecting plate.

4. A bumper assembly comprising:
a bumper;
a crumple element;
a plate connecting the crumple element to a vehicle frame; and
a deformation element including a connection portion connected to the bumper outside the crumple element, a deformation portion outside the connecting plate and oblique to a longitudinal axis, a center portion between the connection portion and the deformation portion and contact face disposed in front of the deformation portion that extends rearwardly and outwardly.

5. The bumper assembly of claim 4 wherein the contact face is tilted towards the outside.

6. The bumper assembly of claim 1 wherein the deformation element is connected to the bumper by a fastener.

7. The bumper assembly of claim 1 wherein the deformation element is a sheet metal part.

8. The bumper assembly of claim 1 wherein the deformation element includes a tapered end.

9. A bumper assembly comprising:
a bumper;
a crumple element connecting the bumper to a vehicle frame through a connection plate; and
a deformation element connected to the bumper outside the crumple element, the deformation element extending rearward from the bumper and outside the connecting plate with a tapered end portion extending inward towards but spaced from the vehicle frame, the tapered end portion including a contact face that is contacted by a rigid barrier to drive the tapered end portion into the vehicle frame.

10. The bumper assembly of claim 9 wherein the end portion is driven rearward in a full-frontal collision without contacting the vehicle frame.

11. The bumper assembly of claim 9 wherein the deformation element includes a first portion extending rearward from the bumper, a second portion outwardly spaced from the connecting plate.

12. The bumper assembly of claim 9 wherein a length of the end portion coincides with a direction of the force, wherein deformation of the deformation element is relatively slight and the bumper deflects laterally relative to the rigid barrier thereby limiting penetration into a wheel region of the vehicle frame.

13. The bumper assembly of claim 9 wherein the contact face disposed in front of the end portion extends front to rear from inside to outside.

14. A bumper assembly comprising:
a bumper;
a crumple element connecting the bumper to a vehicle frame through a connection plate; and
a deformation element connected to the bumper and extending rearward from the bumper and outside the connection plate, a guide face on an inside portion of the deformation element extends obliquely rearward and is in front of and spaced from the connecting plate, an end portion of the deformation element spaced from and extending inward towards the vehicle frame is driven into the vehicle frame in a small overlap collision.

15. The bumper assembly of claim 14 wherein the guide face in a full-frontal collision contacts the connection plate and moves the end portion of the deformation element laterally outward.

* * * * *